US012718527B2

(12) United States Patent
Bahrami et al.

(10) Patent No.: US 12,718,527 B2
(45) Date of Patent: Aug. 25, 2026

(54) SYSTEM, METHOD AND DEVICE FOR DYNAMIC WILDFIRE RISK PREDICTION

(71) Applicant: SenseNet Inc., Vancouver (CA)

(72) Inventors: Shahab Bahrami, Vancouver (CA); Hamed Noori, Vancouver (CA)

(73) Assignee: SenseNet Inc., Vancouver (CA)

( * ) Notice: Subject to any disclaimer, the term of this patent is extended or adjusted under 35 U.S.C. 154(b) by 222 days.

(21) Appl. No.: 18/778,406

(22) Filed: Jul. 19, 2024

(65) Prior Publication Data

US 2026/0024312 A1 Jan. 22, 2026

(51) Int. Cl.
*G06V 10/77* (2022.01)
*G06V 20/10* (2022.01)
*G06V 20/13* (2022.01)

(52) U.S. Cl.
CPC .......... *G06V 10/7715* (2022.01); *G06V 20/13* (2022.01); *G06V 20/188* (2022.01); *G06V 20/194* (2022.01)

(58) Field of Classification Search
CPC .................................................... G06V 20/194
See application file for complete search history.

(56) References Cited

U.S. PATENT DOCUMENTS 6,556,981 B2 * 4/2003 Pedersen .............. G08B 17/005 706/913
9,609,479 B1 * 3/2017 Bostick ................... H04W 4/12
10,299,101 B1 * 5/2019 Lim ..................... G08B 25/005
10,520,645 B2 * 12/2019 Radich .................... G01W 1/10
10,671,912 B2 * 6/2020 Gottfried ............... G06N 3/063
10,783,394 B2 * 9/2020 Molchanov ............ G06V 10/82
10,810,765 B2 * 10/2020 Shen ........................ G06N 3/08
10,854,062 B2 * 12/2020 Ebata .................. G08B 17/125
10,891,524 B2 * 1/2021 Honkala ................ G06V 10/82
11,169,678 B2 * 11/2021 Tohidi ................. G06F 3/04847
11,275,989 B2 * 3/2022 Tschernezki ......... G06N 3/0442
11,295,131 B1 * 4/2022 Dhawan ................. G06V 20/52
11,966,670 B2 * 4/2024 White .................. G06N 3/0464
(Continued)

OTHER PUBLICATIONS

CIPO as ISA, International Search Report and Written Opinion for PCT/CA2024/051305, Oct. 1, 2024.

*Primary Examiner* — Irfan Habib
(74) *Attorney, Agent, or Firm* — Own Innovation; James W. Hinton; Daniel Biggs

(57) ABSTRACT

A system, method, and device for predicting a risk of wildfire are provided. The system includes a satellite imaging device for collecting data covering a target area and a processing server including an indices module for processing the data to generate key vegetation indices, a map generation module configured to generate weather and static maps, an analysis module configured to analyze historical wildfire data to identify past fire locations in the target area, an integration module configured to integrate the received, generated, and analyzed data to obtain a comprehensive dataset for the target area, and a risk prediction module configured to analyze the comprehensive dataset using a risk prediction model trained to predict the risk of wildfire for the targeted area, the risk prediction model including a machine-learning-based pattern detection model for receiving the comprehensive dataset as an input and generate prediction data describing a predicted risk as an output.

20 Claims, 5 Drawing Sheets

(56) References Cited

U.S. PATENT DOCUMENTS 12,374,429 B1* 7/2025 Fay .................... G06V 10/82
2002/0026431 A1* 2/2002 Pedersen .............. G08B 17/125 706/1
2005/0100193 A1* 5/2005 Privalov .............. G08B 17/103 340/630
2005/0240381 A1* 10/2005 Seiler .................... G06F 30/18 703/1
2006/0161467 A1* 7/2006 Kumar .................. G06Q 10/06 705/80
2006/0209184 A1* 9/2006 Chen .................... G08B 29/186 340/600
2007/0208492 A1* 9/2007 Downs ............. G08G 1/096866 701/117
2010/0092045 A1* 4/2010 Zimmer .................. G06F 16/29 382/113
2010/0175695 A1* 7/2010 Jamison ................ A61M 16/12 128/203.14
2012/0066005 A1* 3/2012 Stewart .............. G06Q 30/0282 705/4
2012/0261144 A1* 10/2012 Vian .................... G08B 17/005 169/43
2013/0094699 A1* 4/2013 Ko .................... G06F 18/24323 382/103
2015/0009331 A1* 1/2015 Venkatraman .......... B61L 27/53 348/148
2015/0278603 A1* 10/2015 Boriah ................... G06V 20/13 382/103
2015/0302117 A1* 10/2015 Kim ........................ G01W 1/10 703/2
2016/0132714 A1* 5/2016 Pennypacker ........ G06F 18/217 382/103
2018/0336460 A1* 11/2018 Tschemezki ........... G06N 3/084
2019/0279478 A1* 9/2019 Ebata ................... G08B 17/125
2019/0347836 A1* 11/2019 Sangireddy ............ G06Q 50/02
2020/0155882 A1* 5/2020 Tohidi .................... G06Q 10/04
2020/0159397 A1* 5/2020 Tohidi ................. G06F 3/04847
2021/0287554 A1* 9/2021 Stepp ....................... G08G 5/30
2022/0016455 A1 1/2022 Tohidi et al.
2022/0044057 A1* 2/2022 Ganesan .............. G06V 10/245
2022/0147738 A1* 5/2022 Huang ................. G06V 10/774
2022/0327833 A1* 10/2022 Sambo .................... G06T 7/579
2023/0342902 A1* 10/2023 Manafiazar ........... G06T 7/0002
2024/0233367 A1 7/2024 Motayed et al.
2024/0331361 A1* 10/2024 Cho ....................... G06N 3/045
2025/0225760 A1* 7/2025 Wang ................... G06V 10/774

* cited by examiner

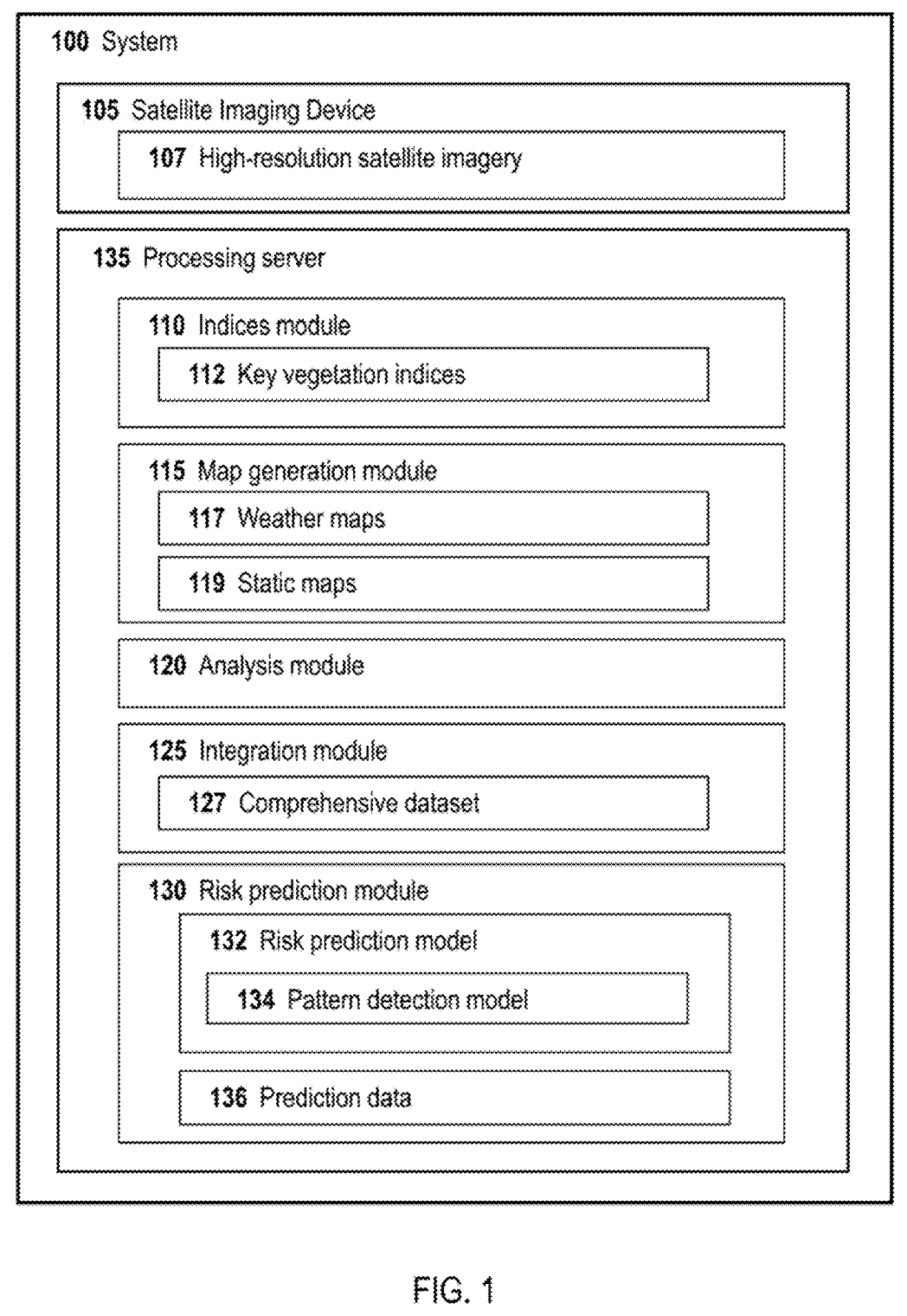

100 System

105 Satellite Imaging Device

107 High-resolution satellite imagery

135 Processing server

110 Indices module

112 Key vegetation indices

115 Map generation module

117 Weather maps

119 Static maps

120 Analysis module

125 Integration module

127 Comprehensive dataset

130 Risk prediction module

132 Risk prediction model

134 Pattern detection model

136 Prediction data

FIG. 1

SYSTEM, METHOD AND DEVICE FOR DYNAMIC WILDFIRE RISK PREDICTION

TECHNICAL FIELD

The following relates generally to wildfire risk management, and more particularly to systems, methods and devices for dynamic wildfire risk prediction.

INTRODUCTION

Wildfires are catastrophic events that can cause significant environmental damage, economic loss and, tragically, the loss of human lives. Therefore, early detection and risk prediction are crucial for minimizing these impacts.

Existing methods for predicting wildfires often lack precision, rely on data that is out of date, or do not effectively integrate multiple critical factors that contribute to wildfire risks. The absence of precise, dynamic risk assessment tools means that pre-emptive actions are not as targeted or effective as they could be, leading to missed opportunities for prevention and early intervention.

Accordingly, there is a need for improved systems, methods and devices for wildfire risk prediction that overcome at least some of the disadvantages of existing techniques.

SUMMARY

A system for predicting a risk of wildfire using artificial intelligence is provided. The system includes a satellite imaging device for collecting satellite image data covering a target area, a processing server for processing the collected satellite image data, the processing server including an indices module configured to receive the satellite image data from the satellite imaging device and process the satellite image data to generate key vegetation indices, a map generation module configured to generate weather maps for the target area based on the key vegetation indices including interpolating weather data and generating static maps for the target area indicating proximity to potential ignition sources based on the key vegetation indices, an analysis module configured to analyze historical wildfire data to identify past fire locations in the target area, an integration module configured to integrate the received satellite image data, the generated weather maps and the generated static maps, and the analyzed historical wildfire data to obtain a comprehensive dataset for the target area, and a risk prediction module configured to analyze the comprehensive dataset using a risk prediction model trained to predict the risk of wildfire for the targeted area, the risk prediction model including a machine-learning-based pattern detection model configured to receive the comprehensive dataset as an input and generate prediction data describing a predicted risk as an output.

Processing the collected satellite image data may further include identifying and removing cloudy pixel data.

The satellite image data may include eight spectral bands for computing the key vegetation indices.

Key vegetation indices may include at least one index selected from the group consisting of Normalized Difference Vegetation Index (NDVI), Enhanced Vegetation Index (EVI), Normalized Difference Water Index (NDWI), Soil Adjusted Vegetation Index (SAVI), Modified Soil Adjusted Vegetation Index (MSAVI), and Red Edge Normalized Difference Vegetation Index (RENDVI).

The weather data may include at least one of air temperature, relative humidity, and wind speed.

Analyzing the historical wildfire data may include identifying patterns and risk factors preceding a wildfire event using an artificial intelligence algorithm.

The system may perform integration using a geographic information system.

The predicted risk may include output as a single numerical score or as a categorical score.

The risk prediction module may be further configured to evaluate a predicted risk against an actual wildfire occurrence to assess an accuracy of the risk prediction model.

A method of predicting a risk of wildfire using artificial intelligence is provided. The method includes receiving satellite image data covering a target area, processing the satellite image data to generate key vegetation indices, generating weather maps for the target area based on the key vegetation indices including interpolating weather data, generating static maps for the target area indicating proximity to potential ignition sources based on the key vegetation indices, analyzing historical wildfire data to identify past fire locations in the target area, integrating the received satellite image data, the generated weather maps and the generated static maps, and the analyzed historical wildfire data to obtain a comprehensive dataset for the target area, and analyzing the comprehensive dataset using a risk prediction model trained to predict the risk of wildfire for the targeted area, the risk prediction model including machine-learning-based pattern detection model configured to receive the comprehensive dataset as an input and generate prediction data describing a predicted risk as an output.

Processing the satellite image data may include identifying and removing cloudy pixel data.

The satellite image data may include eight spectral bands for computing the key vegetation indices.

The key vegetation indices may include at least one index selected from the group consisting of Normalized Difference Vegetation Index (NDVI), Enhanced Vegetation Index (EVI), Normalized Difference Water Index (NDWI), Soil Adjusted Vegetation Index (SAVI), Modified Soil Adjusted Vegetation Index (MSAVI), and Red Edge Normalized Difference Vegetation Index (RENDVI).

The weather data may include at least one of air temperature, relative humidity, and wind speed.

Analyzing the historical wildfire data may include identifying patterns and risk factors preceding a wildfire event using an artificial intelligence algorithm.

The integration may be performed using a geographic information system.

The predicted risk may be output as a single numerical score or a categorical score.

The method may further include evaluating a predicted risk against an actual wildfire occurrence to assess an accuracy of the risk prediction model.

A device for predicting a risk of wildfire using artificial intelligence is provided. The device includes a network interface, a processor, and a non-transitory computer readable memory having stored thereon instructions which, when executed by the processor, cause the device to receive satellite image data covering a target area, process the satellite image data to generate key vegetation indices, generate weather maps for the target area based on the key vegetation indices including interpolating weather data, generate static maps for the target area indicating proximity to potential ignition sources based on the key vegetation indices, analyze historical wildfire data to identify past fire locations in the target area, integrate the received satellite image data, the generated weather maps and the generated static maps, and the analyzed historical wildfire data to obtain a comprehensive dataset for the target area, and analyze the comprehensive dataset using a risk prediction model trained to predict the risk of wildfire for the targeted area, the risk prediction model including a machine-learning-based pattern detection model configured to receive the comprehensive dataset as an input and generate prediction data describing a predicted risk as an output.

Processing the satellite image data may include identifying and removing cloudy pixel data.

The satellite image data may include eight spectral bands for computing the key vegetation indices.

The key vegetation indices may include at least one index selected from the group consisting of Normalized Difference Vegetation Index (NDVI), Enhanced Vegetation Index (EVI), Normalized Difference Water Index (NDWI), Soil Adjusted Vegetation Index (SAVI), Modified Soil Adjusted Vegetation Index (MSAVI), and Red Edge Normalized Difference Vegetation Index (RENDVI).

The weather data may include at least one of air temperature, relative humidity, and wind speed.

Analyzing the historical wildfire data may include identifying patterns and risk factors preceding a wildfire event using an artificial intelligence algorithm.

The integration may be performed using a geographic information system.

The predicted risk may include output as a single numerical score or a categorical score.

The device may be further configured to evaluate a predicted risk against an actual wildfire occurrence to assess an accuracy of the risk prediction model.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of systems, methods, and devices of the present specification. In the drawings:

FIG. 1 is a block diagram of a system for predicting a risk of wildfire using artificial intelligence, according to an embodiment;

DETAILED DESCRIPTION

Figure 2:
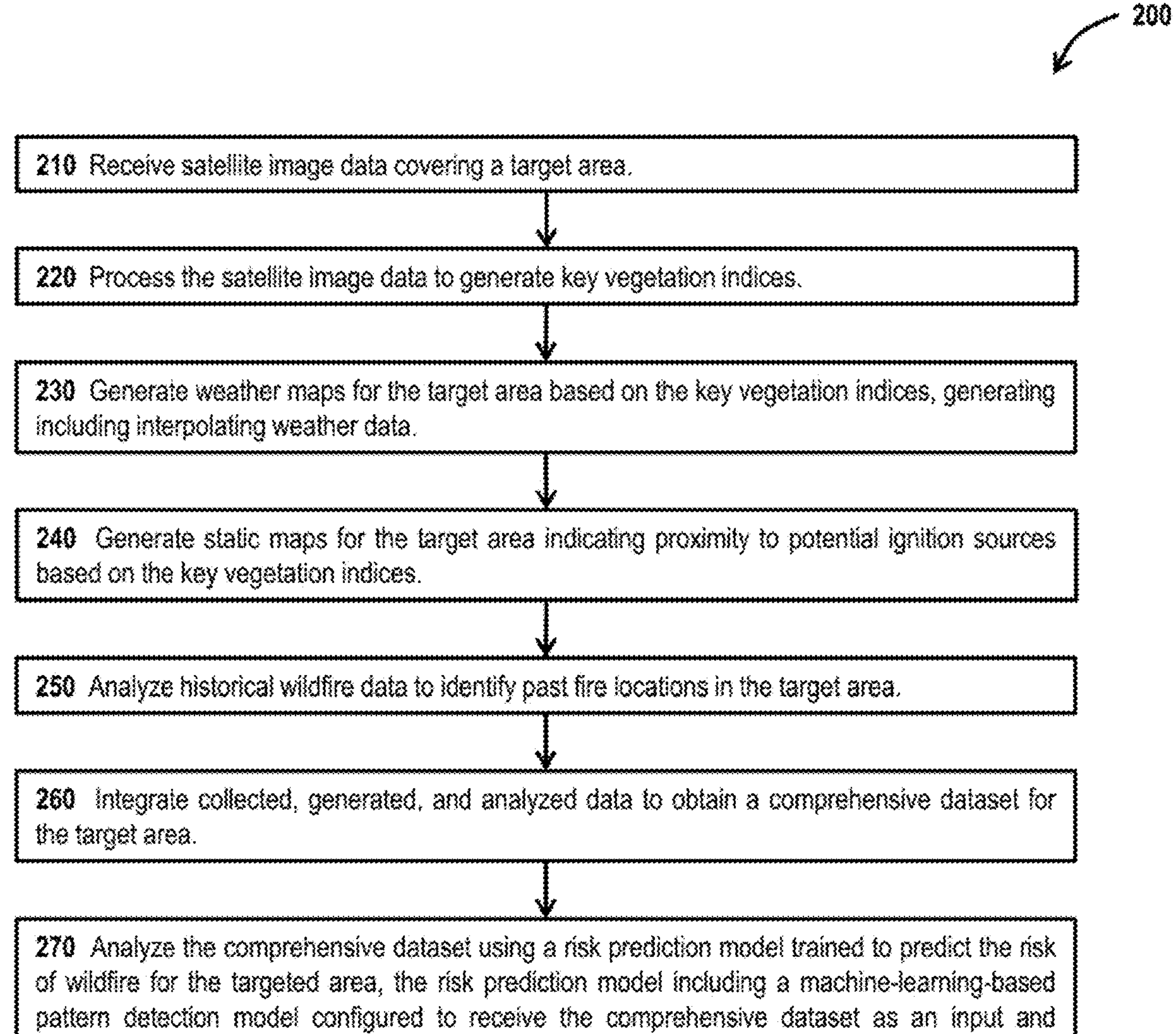
FIG. 2 is a flowchart of a method of predicting a risk of wildfire using artificial intelligence, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

As used herein, the term "about" should be read as including variation from the nominal value, for example, a +/−10% variation from the nominal value. It is to be understood that such a variation is always included in a given value provided herein, whether or not it is specifically referred to.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistants, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present disclosure.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to wildfire risk management, and more particularly to systems, methods and devices for dynamic wildfire risk prediction.

Current wildfire prediction models often rely on coarse spatial resolution data. This lack of high-resolution satellite image data makes it difficult to identify small-scale environmental changes that significantly impact wildfire risks. Moreover, many models do not holistically incorporate or integrate the fire triangle risk factor elements (weather, fuel, and potential ignition sources) alongside topographical features, which are essential for accurate wildfire risk assessment. Similarly, existing models frequently offer static risk assessments that do not reflect daily changes in environmental conditions or potential ignition sources, and the presence of clouds in satellite imagery often interferes with the accurate analysis of ground conditions, leading to gaps in data critical for risk prediction.

To address these challenges, embodiments disclosed herein describe techniques for predicting a risk of wildfire using artificial intelligence. Such techniques include the development of a dynamic, high-resolution wildfire risk prediction model that leverages advanced remote sensing data and machine learning algorithms. The embodiments disclosed herein are multifaceted, integrating daily updates across several critical parameters to provide a comprehensive and up-to-date risk assessment.

The techniques disclosed herein include receiving satellite image data covering a target area, and processing the satellite image data to generate key vegetation indices. Utilizing high-resolution satellite images with about 3 m spatial resolution allows for accurately monitoring changes in vegetation (fuel), moisture levels, and other critical environmental factors.

The techniques disclosed herein further include generating weather maps for the target area based on the key vegetation indices, the generating including interpolating weather data, and generating static maps for the target area indicating proximity to potential ignition sources based on the key vegetation indices. Producing daily maps that may advantageously dynamically reflect changes in the environment, weather, and human factors that lead to a fire forms part of predicting wildfire risks.

The techniques disclosed herein further include analyzing historical wildfire data to identify past fire locations in the target area, and integrating received, generated, and analyzed data to obtain a comprehensive dataset for the target area. Comprehensive risk factor integration includes incorporating a wide range of inputs, including six vegetation indices, weather conditions, topographical features, and proximity to potential ignition sources, to comprehensively assess wildfire risks.

The techniques disclosed herein further include analyzing the comprehensive dataset using a risk prediction model trained to predict the risk of wildfire for the targeted area, the risk prediction model including a machine-learning based pattern detection model configured to receive the comprehensive dataset as an input and generate prediction data describing a predicted risk as an output. Advantageously, embodiments disclosed herein employ machine learning algorithms to analyze historical wildfire data and current conditions, identifying patterns and risk factors that precede wildfire events. The risk prediction model is regularly updated, committing to seasonal reviews and updates to refine the predictions and incorporate the latest data, enhancing accuracy over time.

Machine learning algorithms and automated data processing pipelines may be used in embodiments of the present disclosure for tasks including, without limitation, data collection, processing, and analysis, reducing manual intervention and increasing the efficiency, timeliness of risk assessments, cloud pixel detection and removal, data interpolation for weather parameters, and the generation of probabilistic risk maps.

By applying probabilistic modeling techniques to predict wildfire risks, daily maps may be generated that indicate the likelihood of wildfire occurrences. The foregoing includes statistical analysis and modeling to quantify uncertainty and provide risk assessments in a probabilistic format.

Embodiments disclosed herein provide an innovative, high-resolution, and dynamic tool for wildfire risk prediction, significantly improving the ability of communities, emergency services, and environmental agencies to prepare for, and potentially prevent, wildfires. Advantageously, this proactive approach aims to minimize the devastating impacts of wildfires through early detection and accurate risk assessment, ultimately saving lives, preserving ecosystems, and reducing economic losses.

Another benefit realized from techniques disclosed herein is the ability to provide stakeholders, including fire departments, forest management agencies, and policymakers, with actionable intelligence that may guide preventive measures, resource allocation, and emergency response strategies. The foregoing may advantageously contribute to the safety of communities at risk of wildfires and the preservation of natural environments by enabling more proactive and informed wildfire management practices.

Moreover, leveraging infrastructure such as cloud computing platforms for the processing and analysis of large datasets, including satellite imagery, weather data, and historical wildfire occurrences, further supports the computational techniques disclosed herein, enabling scalable data storage, processing, and analysis capabilities.

Referring now to FIG. 1, shown therein is a block diagram of a system 100 for predicting a risk of wildfire using artificial intelligence, according to an embodiment.

The system 100 includes a satellite imaging device 105 for collecting satellite image data covering a target area. For clarity of illustration, only a single satellite imaging device 105 is shown, but it will be appreciated that the system 100 may include any number of the satellite imaging devices 105, e.g., a plurality of the satellite imaging devices 105.

In an embodiment, the satellite imaging device 105 is a satellite system such as a low earth orbit (LEO), medium earth orbit (MEO), or geostationary orbit (GEO) satellite system.

The device 105 collects high-resolution satellite imagery 107 on a frequent basis (e.g., daily) covering the target area. The imagery 107 includes real-time weather data and information on topographical features and potential ignition sources (e.g., roads, campgrounds, railroads, and power lines).

The system 100 further includes processing server 135 for processing the high-resolution satellite imagery 107 collected by the satellite imaging device 105 and generating output data. Such output data is or is specifically generated by an indices module 110, a map generation module 115, an analysis module 120, an integration module 125, and a risk prediction module 130, as will be further explained hereinbelow.

The indices module 110 is configured to receive the satellite image data 107 from the satellite imaging device 105.

In an embodiment, satellite images of about 3 m spatial resolution are utilized to monitor environmental conditions. This high resolution enables precise detection of changes in vegetation and other critical factors influencing wildfire risk, surpassing the capabilities of current models that rely on coarser data.

The indices module 110 is further configured to process the satellite image data to generate key vegetation indices 112.

Such key vegetation indices 112 serve as indicators of vegetation health, moisture content, and potential fuel availability for wildfires.

The map generation module 115 is configured to generate weather maps 117 for the target area based on the key vegetation indices 112, which are received as input. The generating of the weather maps 117 includes interpolating weather data.

In an embodiment, point-based real-time weather data (e.g., air temperature, relative humidity, wind speed) is interpolated to generate comprehensive weather maps 117 for the target area. This transforms discrete weather observations into a continuous spatial representation, enhancing the environmental assessment capability of the system 100.

The map generation module 115 is further configured to generate static maps 119 for the target area indicating proximity to potential ignition sources based on the key vegetation indices.

In an embodiment, specific buffers are applied, by the map generation module 115 in generating the weather maps 117, around roads, campgrounds, railroads, and power lines to highlight areas of increased risk due to human activities or infrastructure. Such buffers advantageously a unique spatial analysis for the weather maps 117 that contributes to risk assessment.

Moreover, a static map of the topographical aspect is further created and integrated to account for and indirectly measure daily sunlight exposure, a factor in vegetation dryness and, consequently, fuel for wildfires. Thus, an additional layer of risk analysis based on geographical features is gained.

The analysis module 120 is configured to analyze historical wildfire data to identify past fire locations in the target area.

In an embodiment, geospatial analysis includes establishing buffer zones (e.g., of 100 m, 500 m, and 1000 m) around each identified historical wildfire site to study the spatial distribution of fires and associated risk factors. The unique approach of surrounding each identified wildfire with three buffer zones (e.g., at distances of 100 m, 500 m, and 1000 m) allows for differentiated risk analysis based on proximity to previous wildfire locations, which is a novel aspect in wildfire risk assessment. It will be appreciated that a greater number of buffer zones may be provided or applied. It will be appreciated that distances other than those provided in the foregoing examples may be used or applied.

The integration module 125 is configured to integrate received, generated and analyzed data to obtain a comprehensive dataset 127 for the target area.

In an embodiment, the comprehensive dataset 127 for the target area includes, without limitation, fuel sources (e.g., via the key vegetation indices 112), weather conditions (e.g., air temperature, relative humidity, and wind speed), topographical features (e.g., aspect), and proximity to ignition sources (e.g., roads, campgrounds, railroads, and power lines)

The comprehensive dataset 127 may further include historical wildfire aspects, where for each historical wildfire event, relevant data for the day of the fire and any number of preceding days may be extracted and made available, resulting in a detailed historical perspective.

The risk prediction module 130 is configured to analyze the comprehensive dataset 127 using a risk prediction model 132 trained to predict the risk of wildfire for the targeted area. The risk prediction model 132 includes a machine-learning based pattern detection model 134 configured to receive the comprehensive dataset 127 as an input and generate prediction data 136 describing a predicted risk as an output.

In the pattern detection model 134, machine learning algorithms are applied to analyze historical wildfire data alongside current environmental conditions for optimal predictive capabilities.

In an embodiment, the comprehensive dataset 127 is divided into training and testing sets. The risk prediction model 132 may be trained on a training set to identify patterns and correlations between the various factors and the occurrence of wildfires. Such training may include tuning and validating the model to achieve high accuracy and generalizability.

In an embodiment, the trained risk prediction model 132 is used to predict daily wildfire risks across the targeted area, based on the latest available data. Probabilistic maps may be generated, indicating the likelihood of wildfire occurrences at about a 3 m spatial resolution. Such maps may be visual and intuitive, designed to assist decision-makers in prioritizing areas for preventive measures and resource allocation.

Advantageously, embodiments disclosed herein improve wildfire risk prediction and accuracy. Techniques of the present disclosure may be used to significantly enhance the accuracy of wildfire risk predictions by leveraging high-resolution satellite imagery, advanced machine learning algorithms, and comprehensive environmental data analysis. This includes a nuanced assessment of factors such as vegetation health, weather conditions, topographical features, and proximity to potential ignition sources.

Furthermore, the regularly (e.g., daily) updated maps (e.g., the weather maps 117, the prediction data 136) predicting wildfire risks, reflecting real-time changes in weather, vegetation, and human activity in this dynamic implementation represent a significant improvement over the static nature of existing models, offering more timely and relevant risk assessments.

In an embodiment, processing the high-resolution satellite imagery 107 includes identifying and removing cloudy pixel data.

In an embodiment, the processing server 135 includes a specialized sub-module (e.g., a sub-model of the pattern detection model 134) dedicated to cloud detection and employed to identify and eliminate cloudy pixels from the high-resolution satellite imagery 107. Such a specialized sub-module ensures that the analysis is based on clear and accurate imagery, which is crucial for reliable index calculation and risk assessment. This benefit overcomes a common challenge in remote sensing-based models.

In an embodiment, the satellite image data includes eight spectral bands for computing the key vegetation indices 112.

In an embodiment, the processing of the high-resolution satellite imagery 107 across the eight spectral bands to calculate different key vegetation indices 112 is an automated feature. This automation enhances the efficiency and accuracy of the indices module 110 in assessing fuel conditions.

In an embodiment, the key vegetation indices 112 include at least one of: Normalized Difference Vegetation Index (NDVI), Enhanced Vegetation Index (EVI), Normalized Difference Water Index (NDWI), Soil Adjusted Vegetation Index (SAVI), Modified Soil Adjusted Vegetation Index (MSAVI), and Red Edge Normalized Difference Vegetation Index (RENDVI).

In an embodiment, the weather data includes at least one of: air temperature, relative humidity, and wind speed.

In an embodiment, the weather data is obtained via devices or apparatus equipped with various sensors configured to measure aspects including, without limitation, air temperature, relative humidity, wind speed, ground moisture, and the like.

In an embodiment, analyzing historical wildfire data includes identifying patterns and risk factors preceding a wildfire event using an artificial intelligence algorithm (e.g., via the pattern detection model 134).

Such predictive capabilities leverage historical insights to inform future risk assessments. In an embodiment, machine learning algorithms are applied to analyze historical wildfire data alongside current environmental conditions for optimal predictive capabilities.

In an embodiment, the integrating is performed using a geographic information system (GIS).

In an embodiment, the GIS technology is utilized for mapping and spatial analysis including, without limitation, the creation of dynamic and static risk maps, the delineation of buffer zones, and the integration of various spatial data layers. Use of a GIS may be highly valuable for visualizing and analyzing the geographic distribution of risk factors and wildfire occurrences.

In an embodiment, the predicted risk is provided or output as a score.

The score may include a single numerical score, with a greater score corresponding to an elevated risk of wildfire. For example, the score may quantify the risk of wildfire out of 100. Similarly, the score may include a binary determination of risk level, with a value of "1" corresponding to a risk of wildfire and with a value of "0" corresponding to no risk of wildfire.

The score may include a categorical score. For example, the score may be assigned from a fixed set of three or more possible categories with each corresponding to a risk level of wildfire (e.g., none, low, medium, or high). The categorical score may be determined by converting a numerical score to a categorical score, with each category corresponding to a range of possible numerical score values.

In an embodiment, the risk prediction module 130 is further configured to evaluate a predicted risk against an actual wildfire occurrence to assess an accuracy of the risk prediction model 132.

In an embodiment, regular evaluations of the predictions of the risk prediction model 132 against actual wildfire occurrences may be performed to assess both accuracy and reliability. Feedback from such evaluations may further be used to refine and update the risk prediction model 132, incorporating new data and improving predictive capabilities over time.

Data may therefore not only be obtained from multiple sources and sensors, including the high-resolution satellite imagery 107, ground-based weather stations, and topographical data, to create a comprehensive view of the factors influencing wildfire risk, but further from the risk prediction model 132 evaluating and critiquing itself. This approach may advantageously enhance the accuracy and reliability of the risk prediction model 132 by leveraging diverse and refined data inputs.

In an embodiment, techniques presented in the system 100 are subject to seasonal reviews and updates to adapt to changing environmental conditions, vegetation states, and climate patterns. This ensures that the risk prediction model 132 remains relevant and effective in predicting wildfire risks year-round.

Furthermore, regular, seasonal reviews and updates of the predictive algorithms (e.g., the pattern detection model 134) of the risk prediction model 132 and the data sets provided thereto (e.g., the comprehensive dataset 127) may advantageously ensure that the risk prediction model 132 remains accurate over time, adjusting to new patterns in climate, vegetation growth, and urban development.

Techniques disclosed herein may be used to serve as a highly valuable tool for further research and development in the field of wildfire prediction and management, encouraging innovation and the adoption of advanced technologies in environmental monitoring.

Referring now to FIG. 2, shown therein is a flowchart of a method 200 of predicting a risk of wildfire using artificial intelligence, according to an embodiment. All or parts of the method 200 may be implemented at or by the system 100 of FIG. 1.

At 210, the method 200 includes receiving satellite image data covering a target area.

In an embodiment, the satellite image data is high-resolution satellite imagery 107 received from a satellite system (e.g., from the satellite imaging device 105 of the system 100 of FIG. 1) such as a low earth orbit (LEO), medium earth orbit (MEO), or geostationary orbit (GEO) satellite systems.

In an embodiment, the high-resolution satellite imagery 107 is received on a frequent basis (e.g., daily) covering the target area. Additionally, real-time weather data and information on topographical features and potential ignition sources (roads, campgrounds, railroads, and power lines) are gathered.

In an embodiment, satellite images of about 3 m spatial resolution are utilized to monitor environmental conditions. This high resolution enables precise detection of changes in vegetation and other critical factors influencing wildfire risk, surpassing the capabilities of current models that rely on coarser data.

At 220, the method 200 further includes processing the satellite image data to generate key vegetation indices.

Such key vegetation indices serve as indicators of vegetation health, moisture content, and potential fuel availability for wildfires.

At 230, the method 200 further includes generating weather maps for the target area based on the key vegetation indices. Generating weather maps includes interpolating weather data.

In an embodiment, point-based real-time weather data (e.g., air temperature, relative humidity, wind speed) is interpolated to generate comprehensive weather maps for the target area. This transforms discrete weather observations into a continuous spatial representation, enhancing the environmental assessment capability of the method 200.

At 240, the method 200 further includes generating static maps for the target area indicating proximity to potential ignition sources based on the key vegetation indices.

In an embodiment, specific buffers are applied around roads, campgrounds, railroads, and power lines to highlight areas of increased risk due to human activities or infrastructure. This advantageous feature provides a unique spatial analysis that contributes to risk assessment.

Moreover, a static map of the topographical aspect is further created and integrated to account for and indirectly measure daily sunlight exposure, a factor in vegetation dryness and, consequently, fuel for wildfires. Thus, an additional layer of risk analysis based on geographical features is gained.

At 250, the method 200 further includes analyzing historical wildfire data to identify past fire locations in the target area.

In an embodiment, geospatial analysis includes establishing buffer zones of 100 m, 500 m, and 1000 m around each identified historical wildfire site to study the spatial distribution of fires and associated risk factors. The unique approach of surrounding each identified wildfire with three buffer zones at distances of 100 m, 500 m, and 1000 m allows for differentiated risk analysis based on proximity to previous wildfire locations, which is a novel aspect in wildfire risk assessment. It will be appreciated that a different or greater number of buffer zones at the same or other distances may be provided.

At 260, the method 200 further includes integrating received, generated, and analyzed data to obtain a comprehensive dataset for the target area.

In an embodiment, the comprehensive dataset for the target area includes, without limitation, fuel sources (e.g., via the key vegetation indices), weather conditions (e.g., air temperature, relative humidity, and wind speed), topographical features (e.g., aspect), and proximity to ignition sources (e.g., roads, campgrounds, railroads, and power lines).

In an embodiment, the comprehensive dataset further includes historical wildfire aspects, where for each historical wildfire event, relevant data for the day of the fire and any number of preceding days may be extracted and made available, resulting in a detailed historical perspective.

At 270, the method 200 further includes analyzing the comprehensive dataset using a risk prediction model trained to predict the risk of wildfire for the targeted area, the risk prediction model including a machine-learning-based pattern detection model configured to receive the comprehensive dataset as an input and generate prediction data describing a predicted risk as an output.

Accordingly, machine learning algorithms may be used to analyze historical wildfire data alongside current environmental conditions for optimal predictive capabilities.

In an embodiment, the comprehensive dataset is divided into training and testing sets.

In an embodiment, the risk prediction model is trained on a training set to identify patterns and correlations between the various factors and the occurrence of wildfires. Such training may include tuning and validating the model to achieve high accuracy and generalizability.

In an embodiment, the trained risk prediction model is used to predict daily wildfire risks across the targeted area, based on the latest available data. Probabilistic maps may be generated, indicating the likelihood of wildfire occurrences at about a 3 m spatial resolution. Such maps may be visual and intuitive, designed to assist decision-makers in prioritizing areas for preventive measures and resource allocation.

Embodiments disclosed herein may advantageously be used to provide real-time risk assessments by offering daily updated maps that reflect the current risk of wildfire occurrences, enabling more timely and effective responses to potential wildfire threats. These real-time capabilities may advantageously improve upon the static nature of existing models, which may not account for rapid environmental changes.

Moreover, by integrating a wide range of risk factors, including detailed key vegetation indices, weather parameters, topographical features, and human activities, into a unified model, the comprehensive approach disclosed herein ensures a more holistic understanding of wildfire risks.

In an embodiment, processing the satellite image data includes identifying and removing cloudy pixel data.

In an embodiment, a specialized sub-module or sub-model dedicated to cloud detection is employed to identify and eliminate cloudy pixels from the satellite images. This functionality may advantageously ensure that the analysis is based on clear and accurate imagery, which is highly valuable for reliable index calculation and risk assessment. This benefit overcomes a common challenge in remote sensing-based models.

In an embodiment, the satellite image data includes eight spectral bands for computing the key vegetation indices.

In an embodiment, the processing of the satellite images across the eight spectral bands to calculate different vegetation indices may be an automated feature. This automation enhances the efficiency and accuracy of the model in assessing fuel conditions.

In an embodiment, the key vegetation indices include at least one of: Normalized Difference Vegetation Index (NDVI), Enhanced Vegetation Index (EVI), Normalized Difference Water Index (NDWI), Soil Adjusted Vegetation Index (SAVI), Modified Soil Adjusted Vegetation Index (MSAVI), and Red Edge Normalized Difference Vegetation Index (RENDVI).

In an embodiment, the weather data includes at least one of: air temperature, relative humidity, and wind speed.

In an embodiment, the weather data is obtained via devices or apparatus equipped with various sensors configured to measure aspects including, without limitation, air temperature, relative humidity, wind speed, ground moisture, and the like.

In an embodiment, analyzing historical wildfire data includes identifying patterns and risk factors preceding a wildfire event using an artificial intelligence algorithm.

Such predictive capabilities leverage historical insights to inform future risk assessments. Machine learning algorithms may be applied to analyze historical wildfire data alongside current environmental conditions for optimal predictive capabilities.

In an embodiment, the integrating is performed using a geographic information system (GIS).

In an embodiment, GIS technology is utilized for mapping and spatial analysis including, without limitation, the creation of dynamic and static risk maps, the delineation of buffer zones, and the integration of various spatial data layers. Use of a GIS may be highly valuable for visualizing and analyzing the geographic distribution of risk factors and wildfire occurrences.

In an embodiment, the predicted risk is output as a score.

The score may include a single numerical score, with a greater score corresponding to an elevated risk of wildfire. For example, the score may quantify the risk of wildfire out of 100. Similarly, the score may include a binary determination of risk level, with a value of "1" corresponding to a risk of wildfire and with a value of "0" corresponding to no risk of wildfire.

The score may include a categorical score. For example, the score may be assigned from a fixed set of three or more possible categories with each corresponding to a risk level of wildfire (e.g., none, low, medium, or high). The categorical score may be determined by converting a numerical score to a categorical score, with each category corresponding to a range of possible numerical score values.

In an embodiment, the risk prediction module is further configured to evaluate a predicted risk against an actual wildfire occurrence to assess an accuracy of the risk prediction model.

In an embodiment, regular evaluations of the predictions of the risk prediction model against actual wildfire occurrences may be performed to assess both accuracy and reliability. Feedback from such evaluations may further be used to refine and update the model, incorporating new data and improving predictive capabilities over time.

Data may therefore not only be obtained from multiple sources and sensors, including satellite imagery, ground-based weather stations, and topographical data, to create a comprehensive view of the factors influencing wildfire risk, but further from the risk prediction model evaluating and critiquing itself. This approach enhances the accuracy and reliability of the risk prediction model by leveraging diverse and refined data inputs.

In an embodiment, techniques presented in the method 200 are subject to seasonal reviews and updates to adapt to changing environmental conditions, vegetation states, and climate patterns. This ensures that the risk prediction model may advantageously remain relevant and effective in predicting wildfire risks year-round.

Furthermore, regular, seasonal reviews and updates of the predictive algorithms and data sets of the risk prediction model may advantageously ensure that the model remains accurate over time, adjusting to new patterns in climate, vegetation growth, and urban development.

Figure 3:
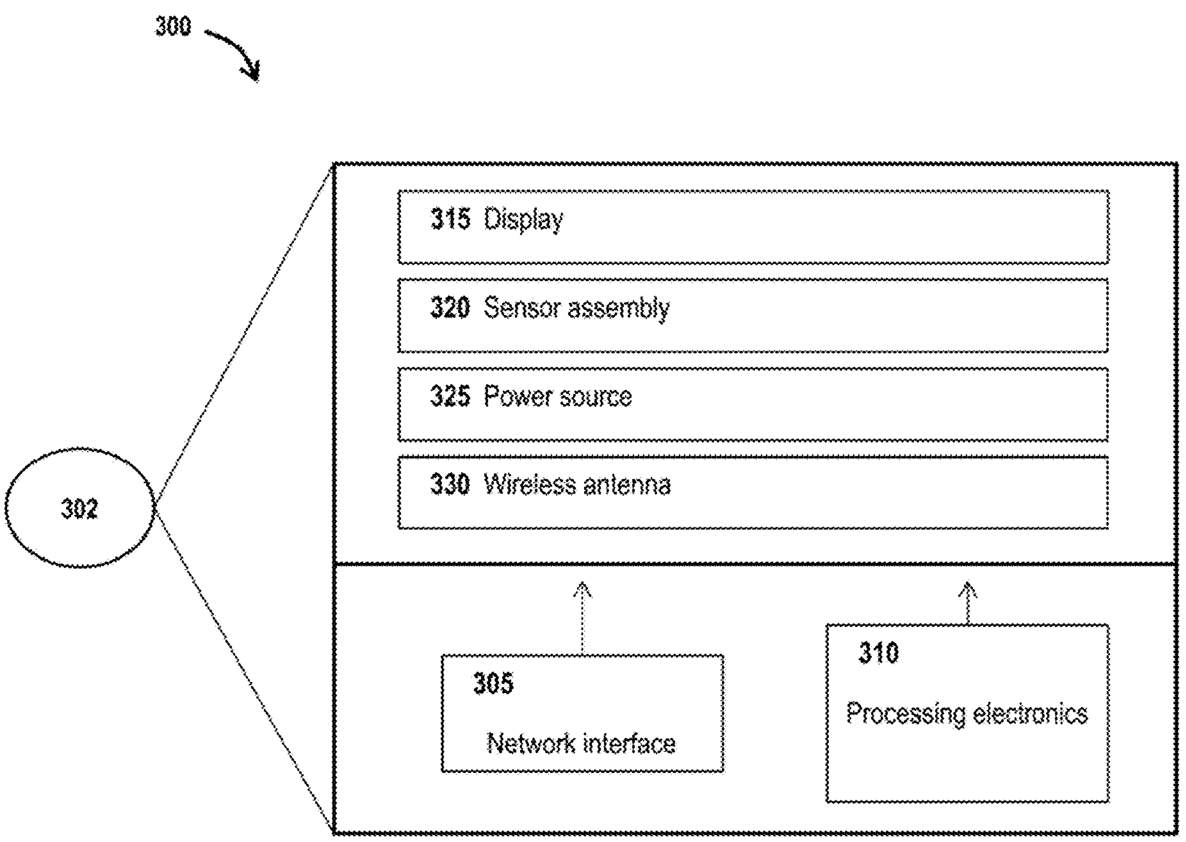
FIG. 3 is a block diagram of a device for predicting a risk of wildfire located within a network, according to an embodiment.

Referring now to FIG. 3, shown therein is a device 300 for predicting a risk of wildfire using artificial intelligence, according to an embodiment.

Figure 4:
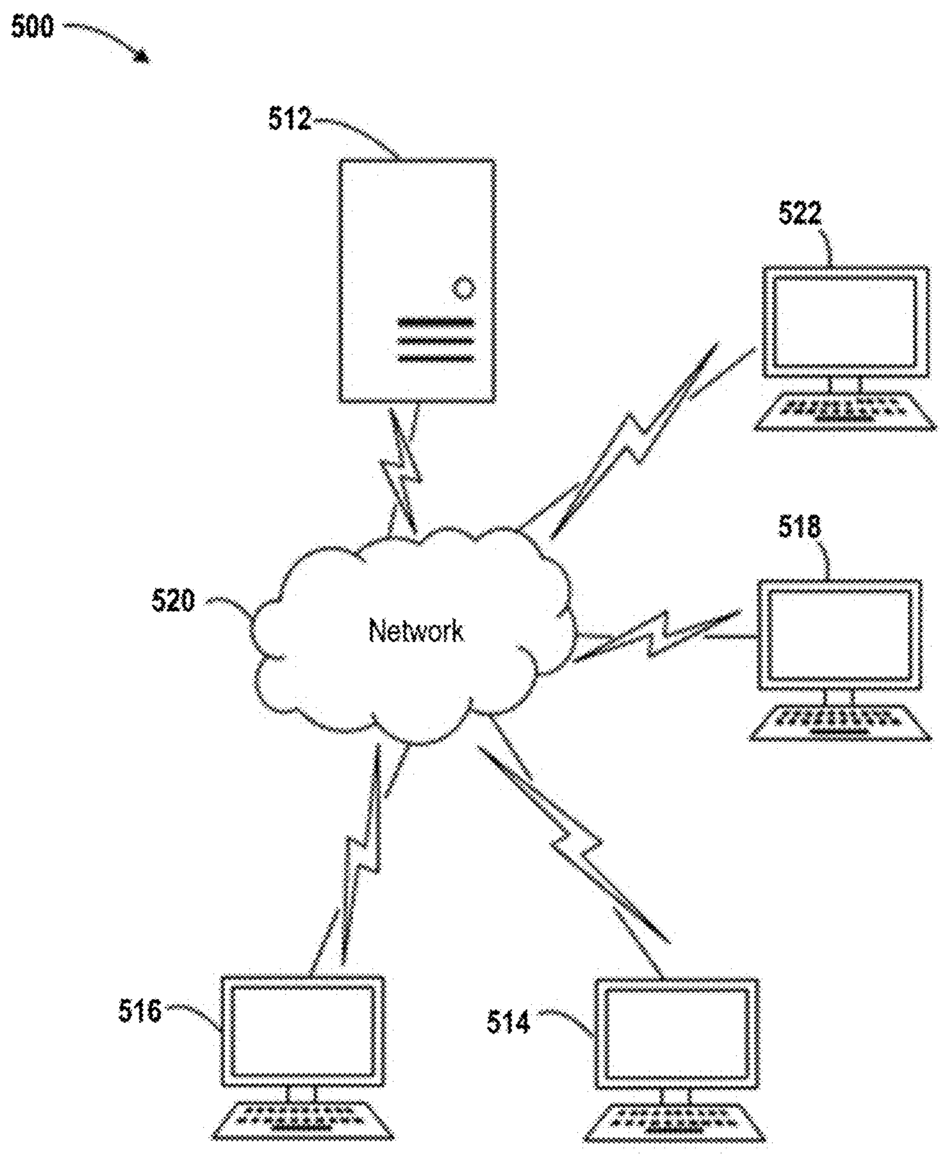
FIG. 4 is a schematic diagram of a system for predicting a risk of wildfire, according to an embodiment.

The device 300 may be located at a node 302 of a network, such as the network 520 of FIG. 4.

The device 300 includes a network interface 305 and processing server 310.

The processing server 310 may include a computer processer executing program instructions stored in memory, or other electronics components such as digital circuitry, including for example FPGAs and ASICs (not shown).

The network interface 305 may include an optical communication interface or radio communication interface, such as a transmitter and receiver.

The device 300 further includes a display 315 (e.g., an LCD screen), a sensor assembly 320, a power source 325, and a wireless antenna 330 for wireless network communication.

User interaction with the device 300 is performed through the display 315. The processing server 310 may interact with the display 315. Information, such as text, characters, symbols, images, icons, and other items that may be displayed or rendered on a computing device as generated by the processing server 310 may be displayed on the display 315.

The sensor assembly 320 includes a plurality of sensors for performing different functions. For example, the sensor assembly 320 may include, without limitation, an air temperature sensor, a carbon dioxide sensor, a smoke sensor, an air humidity sensor, and/or a ground moisture sensor. The sensor assembly 320 may include further or other types of sensors in addition to or instead of the foregoing.

The device 300 may be a battery-powered device and may include a battery interface for receiving one or more rechargeable batteries at the power source 325.

The wireless antenna 330 may be used to connect to any type of wireless network, including, but not limited to, data-centric wireless networks, voice-centric wireless networks, and dual-mode networks that support both voice and data communications.

The device 300 may include several other functional components, each of which is partially or fully implemented using the underlying network interface 305 and processing server 310.

FIG. 4 depicts a network system 500, according to an embodiment.

The network system 500 includes a server 512 configured to communicate with a plurality of satellite imaging devices 514, a plurality of database devices 516, and a plurality of administrator devices 518 via a network 520. The server 512 is further configured to communicate with a plurality of user devices 522. The server 512 may be a purpose-built machine designed specifically for predicting the risk of wildfire using artificial intelligence, such as the device 300 of FIG. 3, for example.

The server 512, satellite imaging devices 514, database devices 516, administrator devices 518 and user devices 522 may be, each or together, a server computer, desktop computer, notebook computer, tablet, PDA, smartphone, or another computing device.

The devices 512, 514, 516, 518, 522 may include a connection with the network 520 such as a wired or wireless connection to the Internet. In some cases, the network 520 may include other types of computer or telecommunication networks.

The devices 512, 514, 516, 518, 522 may include one or more of a memory, a secondary storage device, a processor, an input device, a display device, and an output device. Memory may include random access memory (RAM) or similar types of memory. Also, memory may store one or more applications for execution by a processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage.

Processor may execute applications, computer readable instructions, or programs. The applications, computer readable instructions, or programs may be stored in memory or in secondary storage or may be received from the Internet or other network 520. Input device may include any device for entering information into device 512, 514, 516, 518, 522. For example, the input device may be a keyboard, keypad, cursor-control device, touchscreen, camera, or microphone.

Display device may include any type of device for presenting visual information. For example, display device may be a computer monitor, a flat-screen display, a projector, or a display panel. Output device may include any type of device for presenting a hard copy of information, such as a printer, for example. Output device may also include other types of output devices such as speakers, for example.

In some cases, devices 512, 514, 516, 518, 522 may include multiple of any one or more of processors, applications, software modules, second storage devices, network connections, input devices, output devices, and display devices.

Although devices 512, 514, 516, 518, 522 are described with various components, one skilled in the art will appreciate that the devices 512, 514, 516, 518, 522 may in some cases contain fewer, additional or different components. In addition, although aspects of an implementation of the devices 512, 514, 516, 518, 522 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 512, 514, 516, 518, 522 and/or processor to perform a particular method.

In the present disclosure, devices, apparatus, or other components are described as performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described that the devices 512, 514, 516, 518, 522 may send information to the server 512. For example, a user using the user device 522 may manipulate one or more input devices (e.g., a mouse and a keyboard) to interact with a user interface displayed on a display of the user device 522. Generally, the device 522 may receive a user interface from the network 520 (e.g., in the form of a webpage). Alternatively, or in addition, a user interface may be stored locally at a device (e.g., a cache of a webpage or a mobile application).

The server 512 may be configured to receive a plurality of information, from each of the plurality of satellite imaging devices 514, database devices 516, administrator devices 518, and user devices 522. Generally, the information may comprise at least an identifier identifying the satellite, database, administrator, or user. For example, the information may comprise one or more of a username, e-mail address, password, or social media handle.

In response to receiving information, the server 512 may store the information in storage database. The storage may correspond with secondary storage of the device 512, 514, 516, 518, 522. Generally, the storage database may be any suitable storage device such as a hard disk drive, a solid state drive, a memory card, or a disk (e.g. CD, DVD, or Blu-ray etc.). Also, the storage database may be locally connected with the server 512. In some cases, storage database may be located remotely from the server 512 and accessible to the server 512 across a network, for example the network 520. In some cases, storage database may comprise one or more storage devices located at a networked cloud storage provider.

The satellite imaging device 514 may be associated with a satellite imaging account. Similarly, the database device 516 may be associated with a database account, the administrator device 518 may be associated with an administrator account, and the user device 522 may be associated with a user account. Any suitable mechanism for associating a device with an account is expressly contemplated.

In some cases, a device may be associated with an account by sending credentials (e.g. a cookie, login, or password etc.) to the server 512. The server 512 may verify the credentials (e.g. determine that the received password matches a password associated with the account). If a device is associated with an account, the server 512 may consider further acts by that device to be associated with that account.

Figure 5:
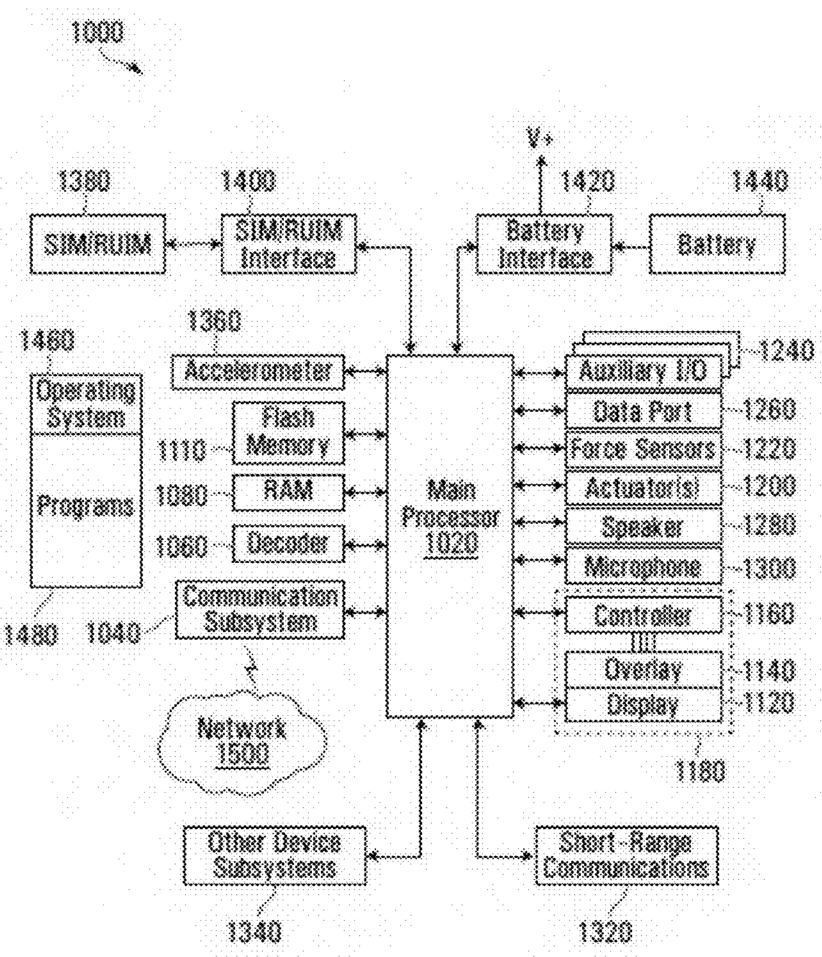
FIG. 5 is a block diagram of an exemplary electronic device for predicting a risk of wildfire, according to an embodiment.

Referring now to FIG. 5, shown therein is a block diagram of a computing device 1000, according to an embodiment. The computing device 1000 may be, for example, a component of the system 100 of FIG. 1, the device 300 of FIG. 3, or a component of the system 500 of FIG. 4. The computing device 1000 may be used to implement all or part of the method 200 of FIG. 2.

The computing device 1000 includes multiple components such as a processor 1020 that controls the operations of the computing device 1000. Communication functions, including data communications, voice communications, or both may be performed through a communication subsystem 1040. Data received by the computing device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The computing device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1110, a display 1120 (e.g., with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a computing device generated by the processor 1020 may be displayed on the touch-sensitive display 1180.

The processor 1020 may also interact with an accelerometer 1360. The accelerometer 1360 may be utilized for detecting direction of gravitational forces or gravity-induced reaction forces.

To identify a subscriber for network access according to the present embodiment, the computing device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1110 or performed using other techniques.

The computing device 1000 also includes an operating system 1460 and software components 1480 that are executed by the processor 1020 and which may be stored in a persistent data storage device such as the flash memory 1110. Additional applications may be loaded onto the computing device 1000 through the wireless network 1500, the auxiliary 1/O subsystem 1240, the data port 1260, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary 1/O subsystem 1240. A subscriber may also compose data items, such as e-mail messages, for example, which may be transmitted over the wireless network 1500 through the communication subsystem 1040.

For voice communications, the overall operation of the computing device 1000 may be similar. The speaker 1280 may output audible information converted from electrical signals, and the microphone 1300 may convert audible information into electrical signals for processing.

While the above description provides examples of one or more systems, methods, or devices, it will be appreciated that other systems, methods, or devices may be within the scope of the claims as interpreted by one of skill in the art. Elements of each embodiment may be incorporated into other embodiments, for example, configurations discussed in relation to one embodiment may be applied to other embodiments disclosed herein. Further, it is evident that various modifications and combinations can be made without departing from the invention. The specification and drawings are, accordingly, to be regarded simply as an illustration of the invention as defined by the claims, and are contemplated to cover any and all modifications, variations, combinations or equivalents that fall within the scope of the present disclosure.

The invention claimed is:

1. A system for predicting a risk of wildfire using artificial intelligence, the system comprising:
a satellite imaging device for collecting satellite image data covering a target area; and
a processing server for processing the collected satellite image data, the processing server comprising:
an indices module configured to:
receive the satellite image data from the satellite imaging device;
process the satellite image data to generate key vegetation indices;
a map generation module configured to:
generate weather maps for the target area based on the key vegetation indices, wherein generating includes interpolating weather data;
generate static maps for the target area indicating proximity to potential ignition sources based on the key vegetation indices;
an analysis module configured to analyze historical wildfire data to identify past fire locations in the target area;
an integration module configured to integrate the received satellite image data, the generated weather maps and the generated static maps, and the analyzed historical wildfire data to obtain a comprehensive dataset for the target area; and
a risk prediction module configured to analyze the comprehensive dataset using a risk prediction model trained to predict the risk of wildfire for the targeted area, the risk prediction model comprising a machine-learning- based pattern detection model configured to receive the comprehensive dataset as an input and generate prediction data describing a predicted risk as an output.

2. The system of claim 1, wherein processing the collected satellite image data further includes identifying and removing cloudy pixel data.

3. The system of claim 1, wherein the satellite image data includes eight spectral bands for computing the key vegetation indices.

4. The system of claim 1, wherein the key vegetation indices include at least one index selected from the group consisting of Normalized Difference Vegetation Index (NDVI), Enhanced Vegetation Index (EVI), Normalized Difference Water Index (NDWI), Soil Adjusted Vegetation Index (SAVI), Modified Soil Adjusted Vegetation Index (MSAVI), and Red Edge Normalized Difference Vegetation Index (RENDVI).

5. The system of claim 1, wherein analyzing the historical wildfire data includes identifying patterns and risk factors preceding a wildfire event using an artificial intelligence algorithm.

6. The system of claim 1, wherein the predicted risk is output as a single numerical score or as a categorical score.

7. The system of claim 1, wherein the risk prediction module is further configured to evaluate a predicted risk against an actual wildfire occurrence to assess an accuracy of the risk prediction model.

8. A method of predicting a risk of wildfire using artificial intelligence, the method comprising:
receiving satellite image data covering a target area;
processing the satellite image data to generate key vegetation indices;
generating weather maps for the target area based on the key vegetation indices, wherein generating the weather maps includes interpolating weather data;
generating static maps for the target area indicating proximity to potential ignition sources based on the key vegetation indices;
analyzing historical wildfire data to identify past fire locations in the target area;
integrating the received satellite image data, the generated weather maps and the generated static maps, and the analyzed historical wildfire data to obtain a comprehensive dataset for the target area; and
analyzing the comprehensive dataset using a risk prediction model trained to predict the risk of wildfire for the targeted area, the risk prediction model comprising a machine-learning-based pattern detection model configured to receive the comprehensive dataset as an input and generate prediction data describing a predicted risk as an output.

9. The method of claim 8, wherein processing the satellite image data includes identifying and removing cloudy pixel data.

10. The method of claim 8, wherein the weather data includes at least one of: air temperature, relative humidity, and wind speed.

11. The method of claim 8, wherein analyzing the historical wildfire data includes identifying patterns and risk factors preceding a wildfire event using an artificial intelligence algorithm.

12. The method of claim 8, wherein the integrating is performed using a geographic information system.

13. The method of claim 8, wherein the predicted risk is output as a single numerical score or a categorical score.

14. The method of claim 8, wherein the method further includes evaluating a predicted risk against an actual wildfire occurrence to assess an accuracy of the risk prediction model.

15. A device for predicting a risk of wildfire using artificial intelligence, the device comprising:
a network interface;
a processor; and
a non-transitory computer readable memory having stored thereon instructions which, when executed by the processor, cause the device to:
receive satellite image data covering a target area;
process the satellite image data to generate key vegetation indices;
generate weather maps for the target area based on the key vegetation indices, wherein generating the weather maps includes interpolating weather data;
generate static maps for the target area indicating proximity to potential ignition sources based on the key vegetation indices;
analyze historical wildfire data to identify past fire locations in the target area;
integrate the received satellite image data, the generated weather maps and the generated static maps, and the analyzed historical wildfire data to obtain a comprehensive dataset for the target area; and
analyze the comprehensive dataset using a risk prediction model trained to predict the risk of wildfire for the targeted area, the risk prediction model comprising a machine-learning-based pattern detection model configured to receive the comprehensive dataset as an input and generate prediction data describing a predicted risk as an output.

16. The device of claim 15, wherein processing the satellite image data includes identifying and removing cloudy pixel data.

17. The device of claim 15, wherein the satellite image data includes eight spectral bands for computing the key vegetation indices; and wherein the key vegetation indices include at least one index selected from the group consisting of Normalized Difference Vegetation Index (NDVI), Enhanced Vegetation Index (EVI), Normalized Difference Water Index (NDWI), Soil Adjusted Vegetation Index (SAVI), Modified Soil Adjusted Vegetation Index (MSAVI), and Red Edge Normalized Difference Vegetation Index (RENDVI).

18. The device of claim 15, wherein analyzing the historical wildfire data includes identifying patterns and risk factors preceding a wildfire event using an artificial intelligence algorithm.

19. The device of claim 15, wherein the predicted risk is output as a single numerical score or a categorical score.

20. The device of claim 15, wherein the device is further configured to evaluate a predicted risk against an actual wildfire occurrence to assess an accuracy of the risk prediction model.

* * * * *